(12) United States Patent
Liu

(10) Patent No.: US 9,272,403 B2
(45) Date of Patent: Mar. 1, 2016

(54) ADJUSTABLE DISMANTLING TOOL FOR ANNULAR MEMBER

(71) Applicant: Jun-Fan Chen, Taichung (TW)

(72) Inventor: Da-Tan Liu, Taichung (TW)

(73) Assignee: Jun-Fun Chen, Taichung (TW)

( * ) Notice: Subject to any disclaimer, the term of this patent is extended or adjusted under 35 U.S.C. 154(b) by 116 days.

(21) Appl. No.: 14/148,707

(22) Filed: Jan. 6, 2014

(65) Prior Publication Data

US 2015/0190912 A1 Jul. 9, 2015

(51) Int. Cl.
  *B23B 31/16* (2006.01)
  *B25B 27/06* (2006.01)
  *B25B 27/00* (2006.01)

(52) U.S. Cl.
  CPC ............... *B25B 27/06* (2013.01); *B23B 31/16* (2013.01); *B25B 27/0035* (2013.01); *Y10T 29/5393* (2015.01)

(58) Field of Classification Search
  CPC    Y10T 29/5393; B25B 27/06; B25B 27/0035; B23B 31/12; B23B 31/1261; B23B 31/1269; B23B 31/1284; B23B 31/1292; B23B 31/16; B23B 31/16195; B23B 31/162; B23B 31/16204; B23B 31/16225; B23B 31/16229

USPC ........... 29/275; 269/48.1, 48.2, 47, 87.1, 87.2
  See application file for complete search history.

(56) References Cited

U.S. PATENT DOCUMENTS 6,916,026 B2 * 7/2005 Meza .......................... 279/110

* cited by examiner

*Primary Examiner* — Lee D Wilson
*Assistant Examiner* — Jamal Daniel

(57) ABSTRACT

An adjustable dismantling tool for annular member is provided. A handle has opposing first end and second end and an axial direction passing through the first and second ends. A first main body is disposed at the second end and radially unmovable relative to the axial direction. A second main body is rotatably assembled with the first main body, radially unmovable relative to the axial direction and radially formed with a plurality of guiding troughs relative to the axial direction. Each of movable members has a guiding block slidably disposed in corresponding guiding trough. Each of connecting arms is disposed between the first and second main bodies, pivoted to the first main body and one of the guiding block to respectively form a first pivoting portion and a second pivoting portion, and swingable about the axial direction with the first pivoting portion as the center.

11 Claims, 6 Drawing Sheets

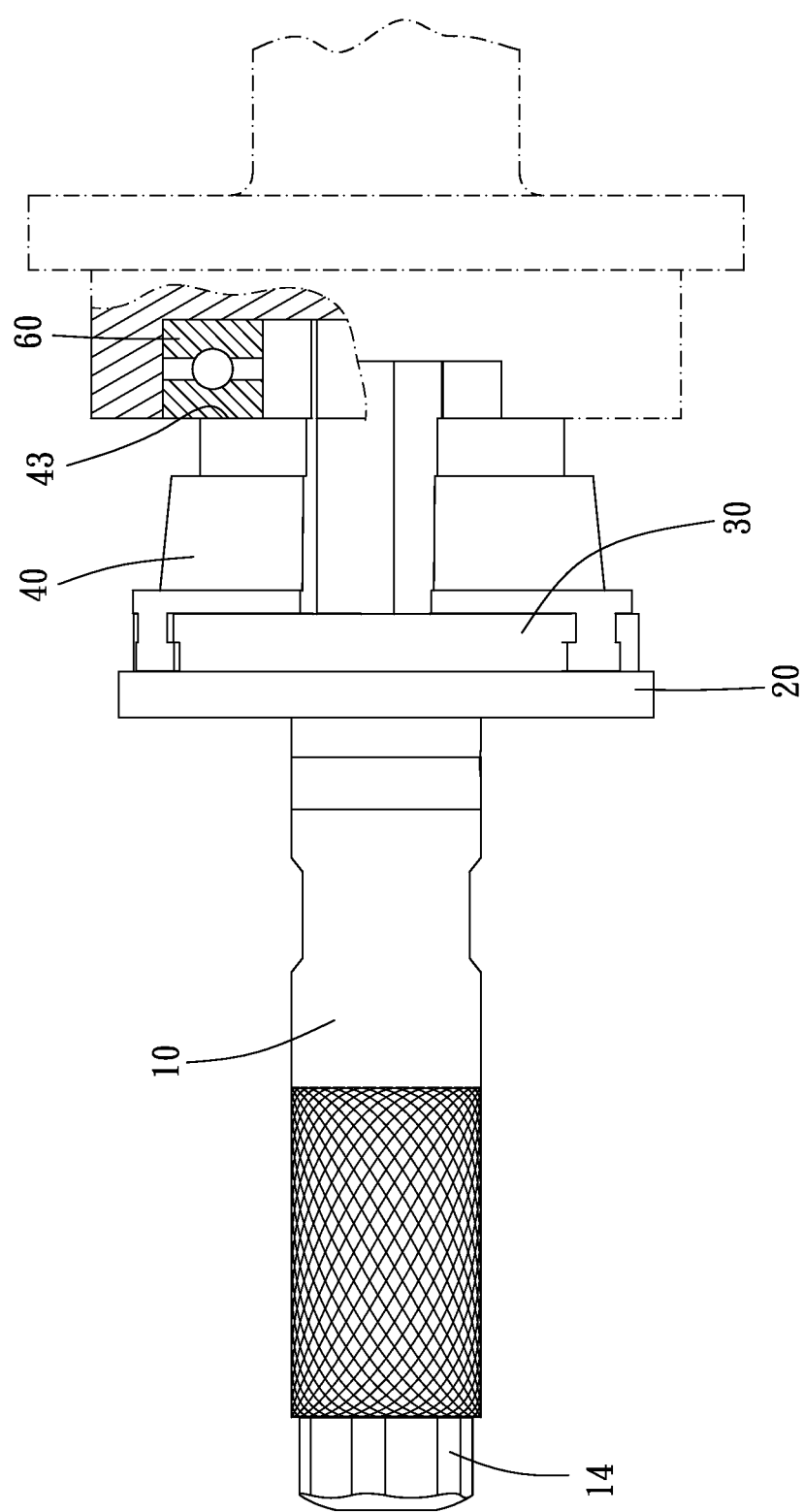

ADJUSTABLE DISMANTLING TOOL FOR ANNULAR MEMBER

BACKGROUND OF THE INVENTION

1. Field of the Invention

The present invention relates to an adjustable dismantling tool for annular member.

2. Description of the Prior Art

Many structures use the assembling of axle bearing to decrease friction, reduce noise and achieve other effects, so axle bearing is often used in a mechanical structure.

The conventional way of assembling an axle bearing is to put the axle bearing in the part of a mechanical structure in which a user wants to assemble the axle bearing and use impact tools such as a hammer to impact so as to gradually push the axle bearing into the part the user wants to assemble; wherein the conventional axle bearing mounting tool is in fixed size, so when the user wants to assemble different sizes of axle bearings, the axle bearing mounting tool needs to be in the same size as the axle bearing. It is inconvenient for users to assemble the axle bearing.

In addition, some of the conventional axle bearing mounting tools are radially adjustable, for example, the axle bearing mounting tool disclosed in TWM355779 and TWM449226. However, in the axle bearing mounting tools disclosed in the above-mentioned patents, a plurality of corresponding grooves need to be disposed on a face of an adjusting member, a number of concave grooves equal to that of the corresponding grooves is disposed on a fixing member, each concave groove is formed with a movable member, and an end of the movable member is formed with a positioning rib extending into one of the corresponding grooves so as to rotate the adjusting member, to allow each movable member to move in the area reachable by the concave groove and further to change radial size. Because this kind of structure is complex and difficult to manufacture and each movable member is limited by the concave groove, radial expansion or contraction on a rotation direction cannot be carried out simultaneously. The way of adjusting the axle bearing mounting tool still needs to be improved.

The present invention is, therefore, arisen to obviate or at least mitigate the above-mentioned disadvantages.

SUMMARY OF THE INVENTION

The main object of the present invention is to provide an adjustable dismantling tool for annular member, which has simple structure and is easy to manufacture and adjust, and it is convenient to assemble, disassemble or/and change different components according to various requirements.

To achieve the above and other objects, an adjustable dismantling tool for annular member of the present invention is provided, including a handle, a first main body, a second main body, a plurality of movable members and a plurality of connecting arms. The handle has a first end and a second end corresponding to the first end and an axial direction passing through the first end and the second end. The first main body is disposed at the second end and radially unmovable relative to the axial direction. The second main body is disposed relative to the first main body and radially unmovable relative to the axial direction. The second main body is rotatable relative to the first main body around the axial direction, and a plurality of guiding troughs are radially formed relative to the axial direction. Each movable member has a guiding block slidably disposed in the corresponding guiding trough for extending into an interior of an annular member to operate. The connecting arms are formed between the first main body and the second main body. Each connecting arm is pivoted to the first main body and one of the guiding blocks to respectively form a first pivoting portion and a second pivoting portion. Each connecting arm is swingable about the direction around the axial direction with the first pivoting portion as the center.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 8 is a drawing showing the application status of the first preferred embodiment of the present invention.

DETAILED DESCRIPTION OF THE PREFERRED EMBODIMENTS

Figure 1:
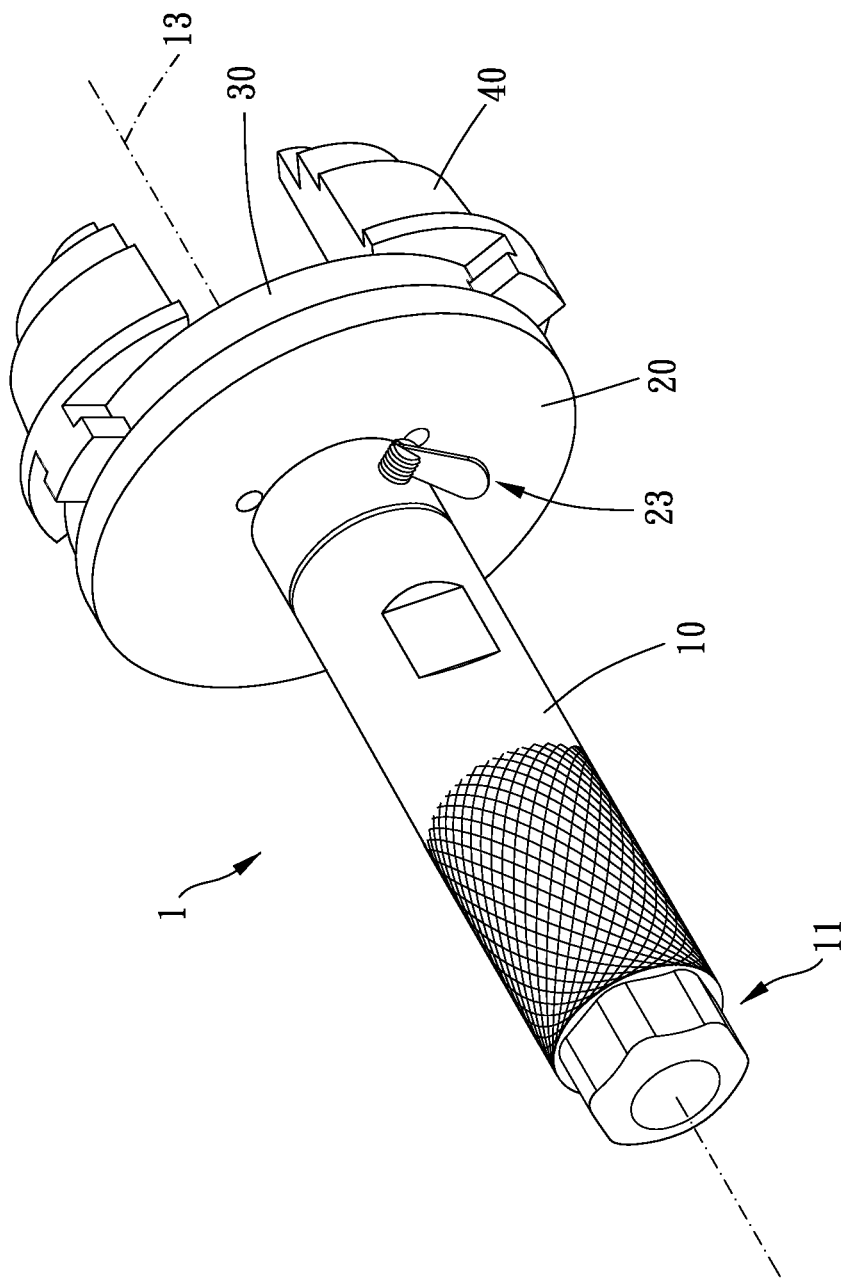
FIG. 1 is a stereogram of a first preferred embodiment of the present invention.
Figure 2:
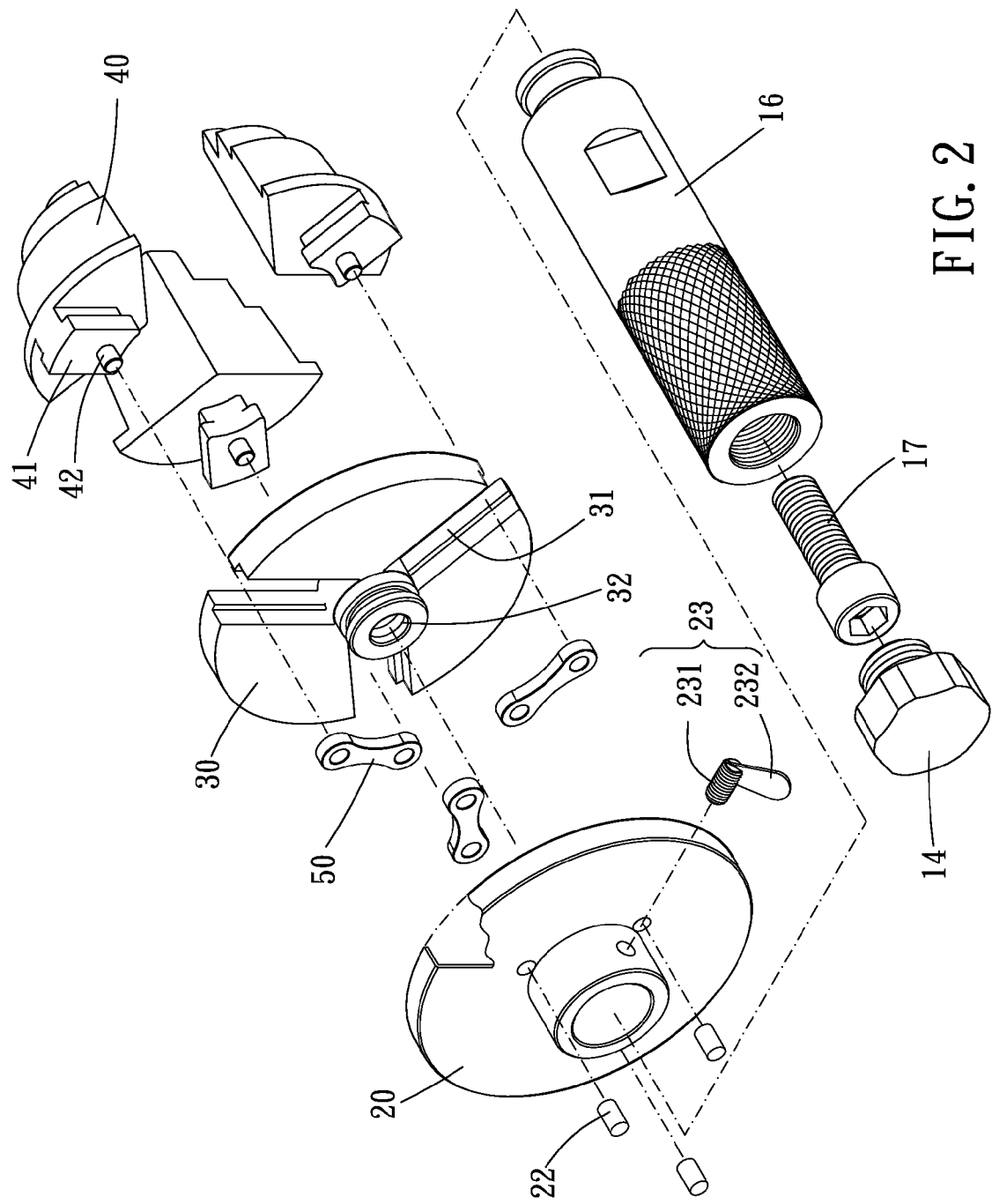
FIG. 2 is a breakdown drawing of the first preferred embodiment of the present invention.
Figure 3:
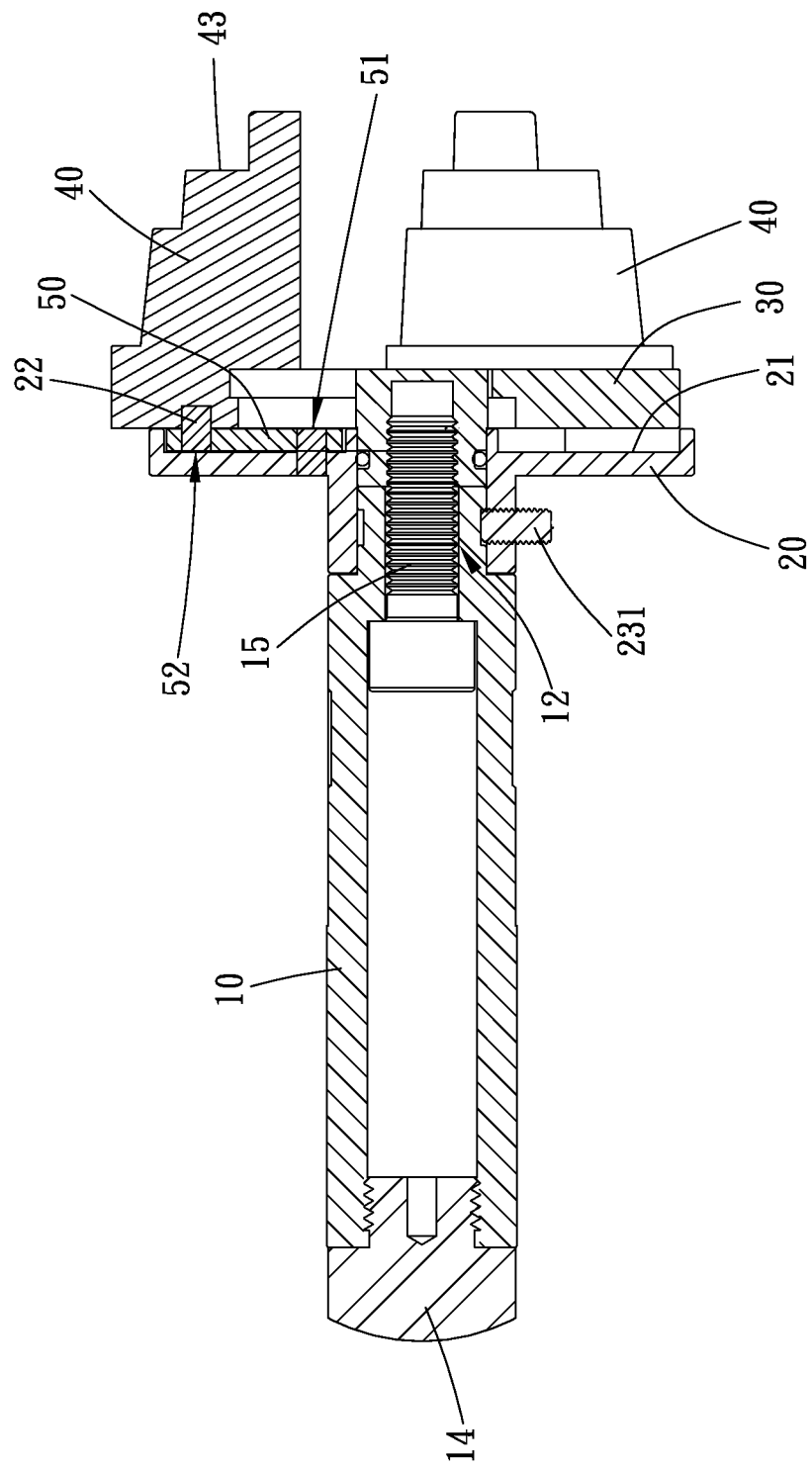
FIG. 3 is a cross-sectional view of the first preferred embodiment of the present invention.
Figure 5:
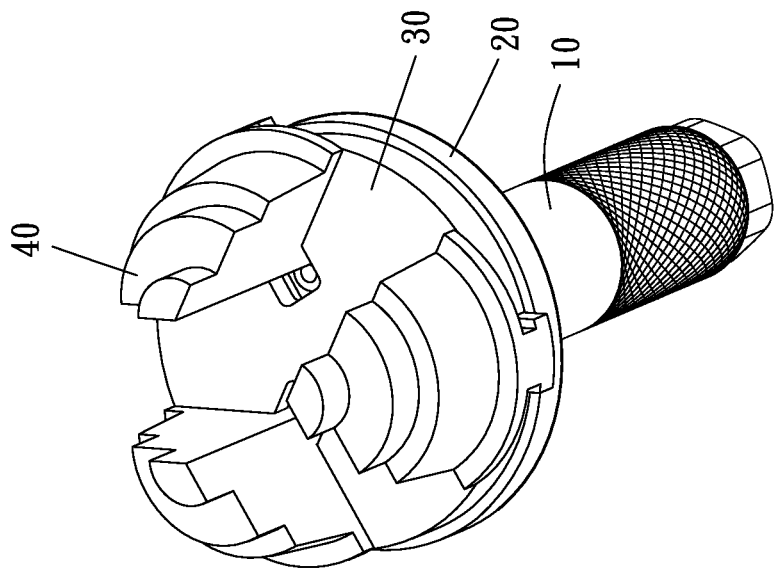
FIGS. 4 and 5 are stereograms of the first preferred embodiment of the present invention in another two perspectives.
Figure 4:
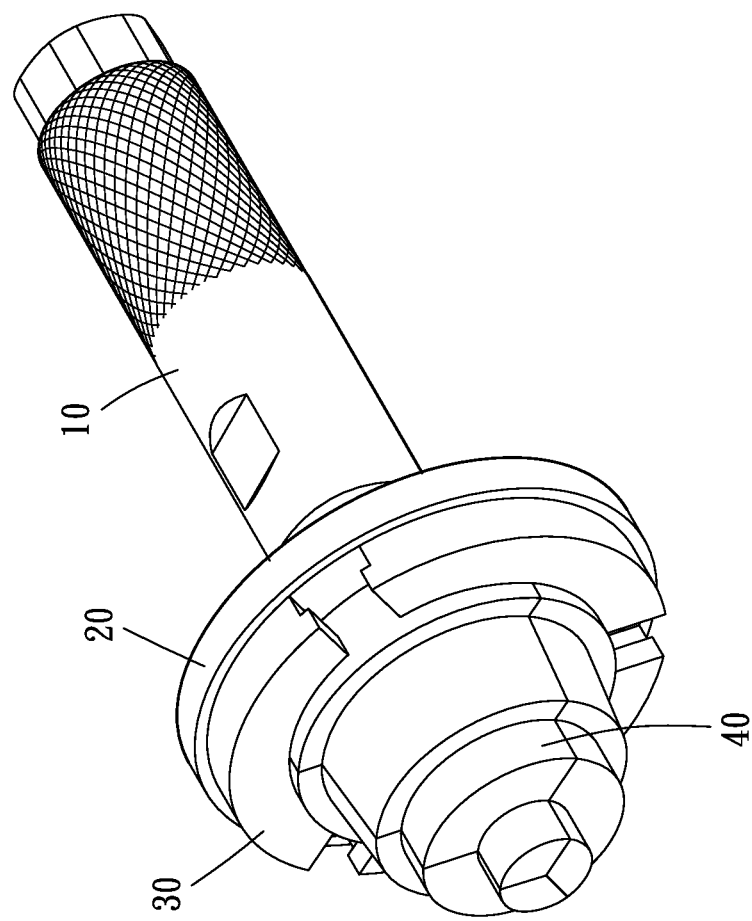
Figure 7:
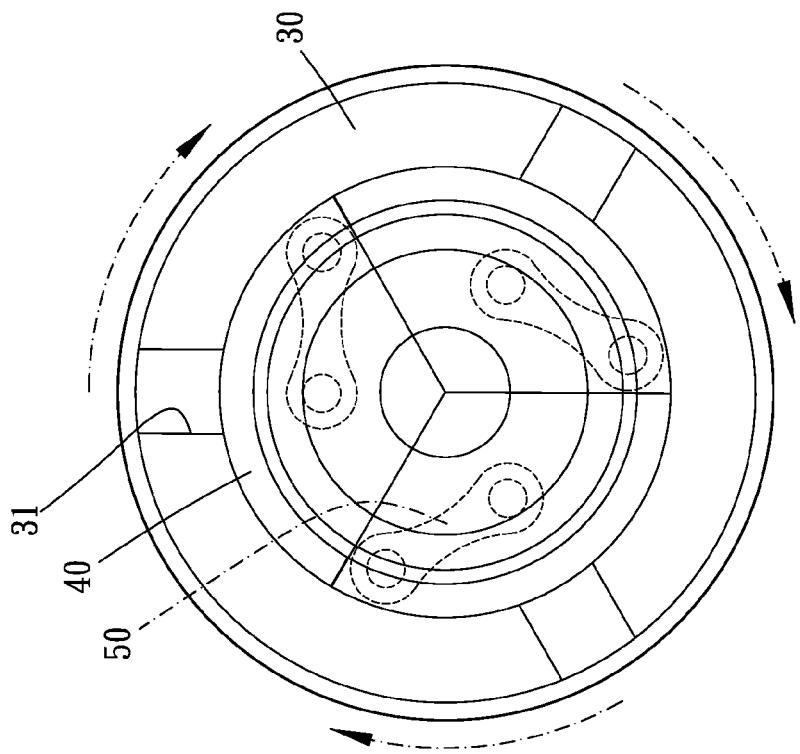
FIGS. 6 and 7 are drawings showing the first preferred embodiment of the present invention in use.
Figure 6:
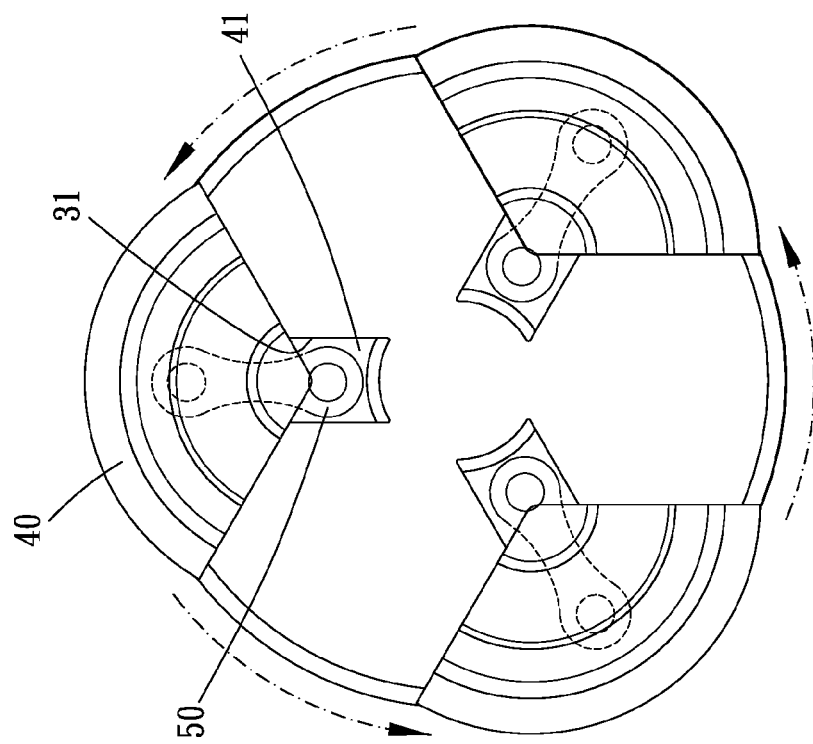

Please refer to FIGS. 1 to 3 for a first preferred embodiment of the present invention. An adjustable dismantling tool for annular member 1 of the present invention includes a handle 10, a first main body 20, a second main body 30, a plurality of movable members 40 and a plurality of connecting arms 50.

The handle 10 has a first end 11, a second end 12 corresponding to the first end 11 and an axial direction 13 passing through the first end 11 and the second end 12, wherein an impact portion 14 is detachably screwed to the first end 11, and the second end 12 is formed with a first threaded portion 15. Specifically, the handle 10 includes a hollow rod member 16 and a screw member 17 disposed in the hollow rod member 16 and extends out of the hollow rod member 16. An end of the hollow rod member 16 is inserted in the first main body 20, and the first threaded portion 15 is disposed on the screw member 17, protruded out of the hollow rod member 16 and extends into the first main body 20.

The first main body 20 is substantially a board body disposed at the second end 12. The first main body 20 is radially unmovable relative to the axial direction. The first main body 20 has a first face 21 opposite to the first end 11, and the first face 21 is protrudingly formed with a plurality of first protruding pillars 22 protruding toward the second main body 30. Specifically, the number of the first protruding pillars 22 is three, and the first protruding pillars 22 are arranged equiangularly relative to the axial direction 13. Understandably, the number of the first protruding pillars 22 can be two or more than two. The first protruding pillars 22 are in column shape, and the first protruding pillars 22 are axially disposed on the second main body 30 and protrusive relative to the first face 21. In addition, the first protruding pillars 22 can also integrally extend from the first face 21. Preferably, the first main body is formed with a radially adjustable positioning member 23, and the positioning member 23 is controllably abutted against the hollow rod member 16. Specifically, the positioning member 23 includes a threaded rod 231 screwed to the first main body 20 and a wrenching sheet 232 movably disposed on the threaded rod 231. By wrenching the wrenching sheet 232, the threaded rod 231 can be screwed and moved toward or away from the hollow rod member 16 so as to fix or release the hollow rod member 16.

The second main body 30 is substantially a board body disposed relative to the first main body 20. The second main body 30 is radially unmovable relative to the axial direction 13, but the second main body 30 can rotate relative to the first main body 20 around the axial direction 13. The second main body 30 is radially formed with a plurality of guiding troughs 31 relative to the axial direction 13. Specifically, the number of the guiding troughs 31 is three, the guiding troughs 31 are arranged equiangularly relative to the axial direction 13. Each guiding trough 31 is open on a peripheral surface of the second main body 30. In this embodiment, the first main body 20 can rotate around the hollow rod member 16 (or the axial direction 13), and the second main body 30 is formed with a second threaded portion 32 which can be screwed to the first threaded portion 15. Specifically, the second threaded portion 32 is a threaded hole. The first threaded portion 15 is disposed through the first main body 20 and screwed to the second threaded portion 32, and the first main body 20 is rotatable relative to the hollow rod member 16; but the second main body 30 is unrotatable relative to the handle 10. It is noted that in other embodiments, the first main body 20 can be designed to be fixedly connected with the hollow rod member 16, and the second main body 30 is rotatable relative to the handle 10. In other words, the design can be varied as long as the first main body 20 and the second main body 30 are rotatable relative to each other.

In this embodiment, the number of the movable members 40 is three, and the movable members 40 are arranged equiangularly relative to the axial direction 13. Each movable members 40 has a guiding block 41 slidably disposed in the corresponding guiding trough 31 and is radially movable in the corresponding trough 31, wherein the movable members 40 are provided for extending into an interior of an annular member such as an axle bearing to operate. Specifically, the guiding block 41 of each movable member 40 is protrudingly formed with a second protruding pillar 42 protruding toward the first main body 20, and each second protruding pillar 42 is in column shape and axially integrally disposed on the corresponding guiding block 41.

The connecting arms 50 are disposed between the first main body 20 and the second main body 30, and each connecting arm 50 is pivoted to the first main body 20 and one of the guiding blocks 41 to form a first pivoting portion 51 and a second pivoting portion 52 respectively. Each connecting arm 50 is swingable about a direction around the axial direction 13 with the first pivoting portion 51 as the center. Specifically, two ends of each connecting arm 50 are respectively pivoted to one of the first protruding pillars 22 and one of the second protruding pillars 42.

Please refer to FIGS. 4 to 8. When the present invention is operated, such as assembling an axle bearing 60, the movable members 40 are contracted to be in stepped column shape with a smaller diameter (shown in FIGS. 4 and 7), the movable members 40 are inserted into the axial hole of the axle bearing 60 (shown in FIG. 8), and then one of the handle 10 and the first main body 20 is rotated reversely relative to the other. Because the second main body 30 is fixedly connected with the handle 10, the handle 10 will drive the second main body 30 and the movable members 40 to rotate together. The guiding blocks 41 are driven by the second protruding pillars 42 to radially move outward along the corresponding guiding trough 31 (shown in FIGS. 5 and 6) until the movable members 40 is abutted against the inner wall of the axial hole of the axle bearing 60, and the stepped face 43 of each movable member 40 is abutted against the axially lateral wall of the axle bearing 60 (shown in FIG. 8). Then, an impact tool can be used to impact the impact portion 14 of the handle 10 so as to assembling the axle bearing 60 into the object to be assembled. It is noted that the adjustable dismantling tool for annular member 1 of the present invention can also be used to impact an axle bearing originally disposed in a through hole so that the axle bearing can be removed from the through hole.

Given the above, the adjustable dismantling tool for annular member of the present invention can use the connecting arms to pivot to the first main body and the movable members without disposing a plurality of sliding grooves on the first main body, so the present invention has a simple structure, and it is easy to manufacture. Furthermore, during rotation of the first main body in a rotation direction, the movable members can radially expand or contract (take the outmost radial dead center of the second pivoting portions as the basis) to meet various requirement, so it is convenient to adjust.

In addition, the handle can be design to be a multi-piece structure which is convenient to assemble and disassemble, or/and it can change different components according to various requirements.

Given the above, the structure, practicability and efficiency of the present invention can help to promote the development of the industry, and the structure disclosed in the present invention is unprecedentedly innovative.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An adjustable dismantling tool for annular member, including:
  a handle, having a first end, a second end corresponding to the first end and an axial direction passing through the first end and the second end;
  a first main body, disposed at the second end, being radially unmovable relative to the axial direction;
  a second main body, disposed relative to the first main body, being radially unmovable relative to the axial direction, being rotatable relative to the first main body around the axial direction, formed with a plurality of guiding troughs radially relative to the axial direction;
  a plurality of movable members, each having a guiding block slidably disposed in the corresponding guiding trough, provided for extending into an interior of an annular member to operate; and
  a plurality of connecting arms, sandwiched between the first main body and the second main body, each connecting arm pivoted to the first main body and one of the guiding block to form a first pivoting portion and a second pivoting portion respectively, each connecting arm swingable about the first pivoting portion along a direction around the axial direction;
  wherein an impact portion is provided at the first end, the impact portion has an outer face for being impacted by an external force;
  wherein each movable member is stepped on an outer circumferential surface thereof to formed with at least one stepped face and a distal end extending perpendicularly from one of the at least one stepped face along the axial direction, each distal end of each movable member is partially insertable into an axial hole of a bearing and one of the at least one stepped face is axially in face contact with a side face of the bearing perpendicular to the axial direction.

2. The adjustable dismantling tool for annular member of claim 1, wherein the first main body has a first face opposite to the first end, the first face is formed with a plurality of first protruding pillars protruded toward the second main body, and each connecting arm is pivoted to one of the first protruding pillars.

3. The adjustable dismantling tool for annular member of claim 1, wherein a second protruding pillar is protruded on the guiding block of each movable member and toward the first main body, and each connecting arm is pivoted to one of the second protruding pillars.

4. The adjustable dismantling tool for annular member of claim 1, wherein each guiding trough is open on a peripheral surface of the second main body.

5. The adjustable dismantling tool for annular member of claim 1, wherein the second end has a first threaded portion, and the second main body has a second threaded portion which can be screwed to the first threaded portion.

6. The adjustable dismantling tool for annular member of claim 5, wherein the handle includes a hollow rod member, a screw member disposed in the hollow rod member with an end extending out of the hollow rod member, the first threaded portion is disposed on the screw member and protruded out of the hollow rod member, the second threaded portion is a threaded hole, the first threaded portion extends out of the first body and is screwed to the second threaded portion, and the first main body is rotatable relative to the hollow rod member.

7. The adjustable dismantling tool for annular member of claim 6, wherein the first main body has a radially adjustable positioning member, and the positioning member is controllably abutted against the hollow rod member.

8. The adjustable dismantling tool for annular member of claim 7, wherein the positioning member includes a threaded rod screwed to the first main body and a wrenching sheet movably disposed at an end of the threaded rod.

9. The adjustable dismantling tool for annular member of claim 1, wherein the impact portion is detachably screwed to the first end.

10. The adjustable dismantling tool for annular member of claim 1, wherein each outer circumferential surface of each movable member is steppedly conically tapered toward the distal end.

11. The adjustable dismantling tool for annular member of claim 1, wherein inner faces of the movable members are radially movably and entirely contactable with each other to form a solid post.

* * * * *